Aug. 20, 1946.  E. D. BOYCE  2,406,130
COIL WINDING APPARATUS
Filed Sept. 12, 1942  5 Sheets-Sheet 1
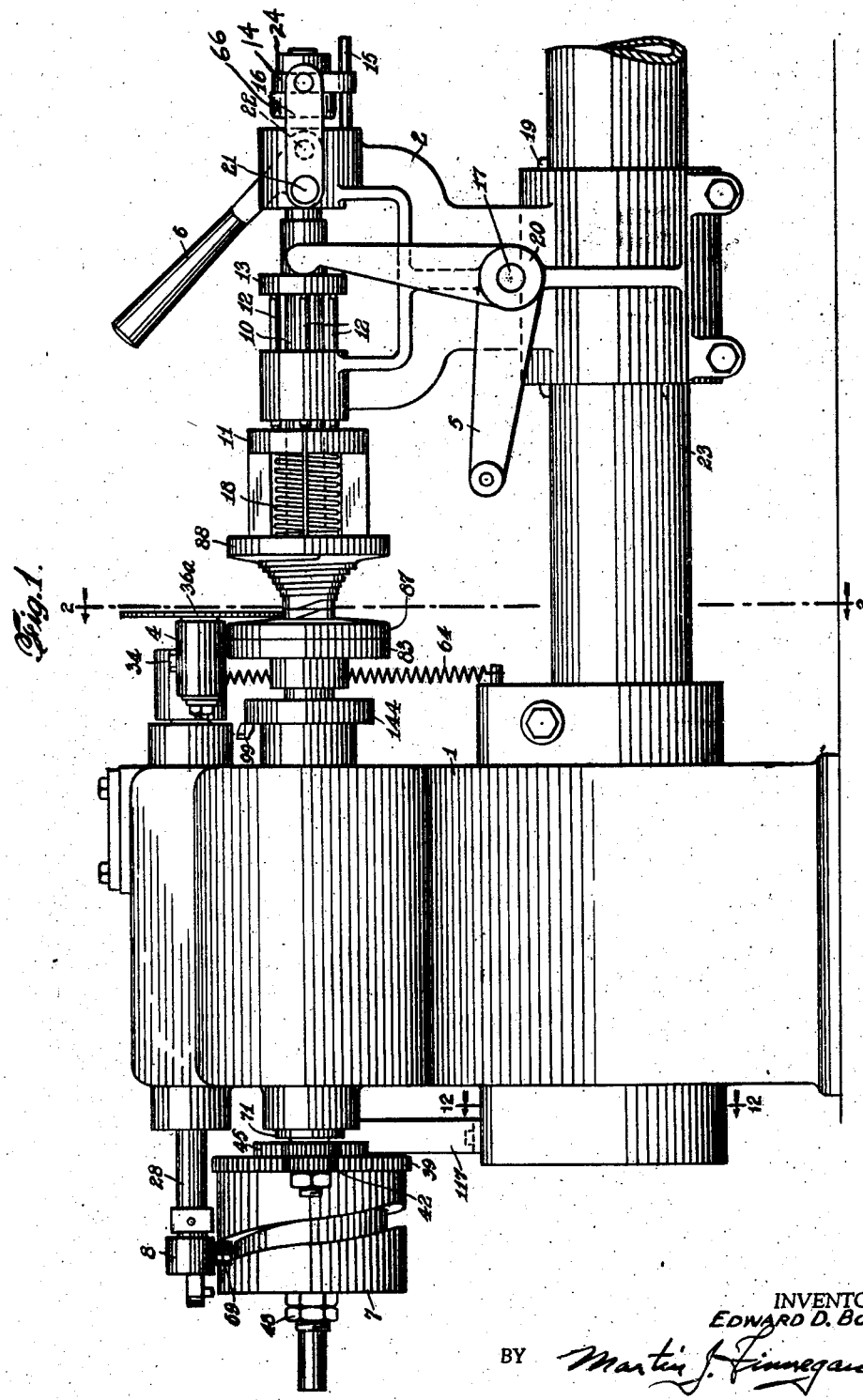
INVENTOR.
EDWARD D. BOYCE
BY
ATTORNEY.

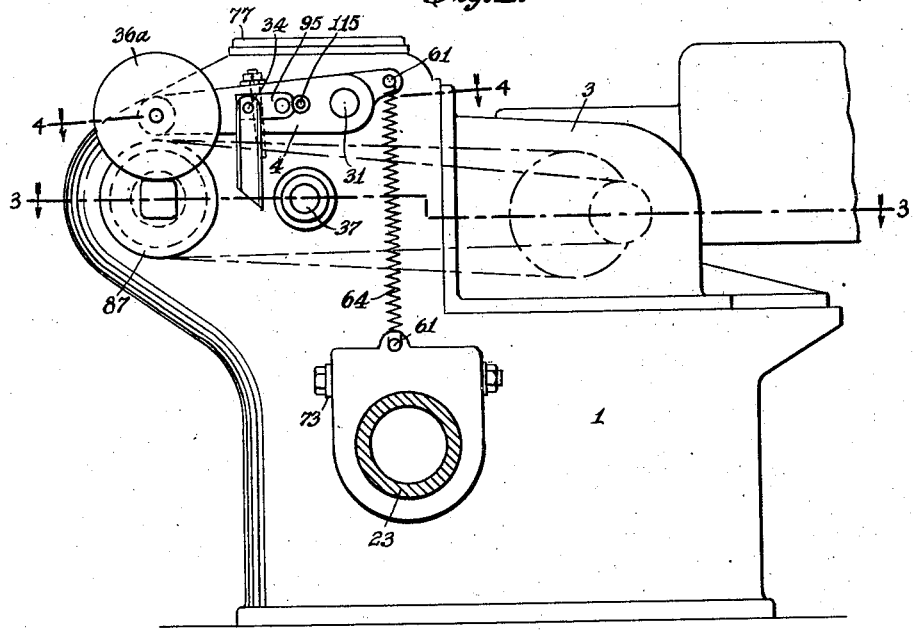
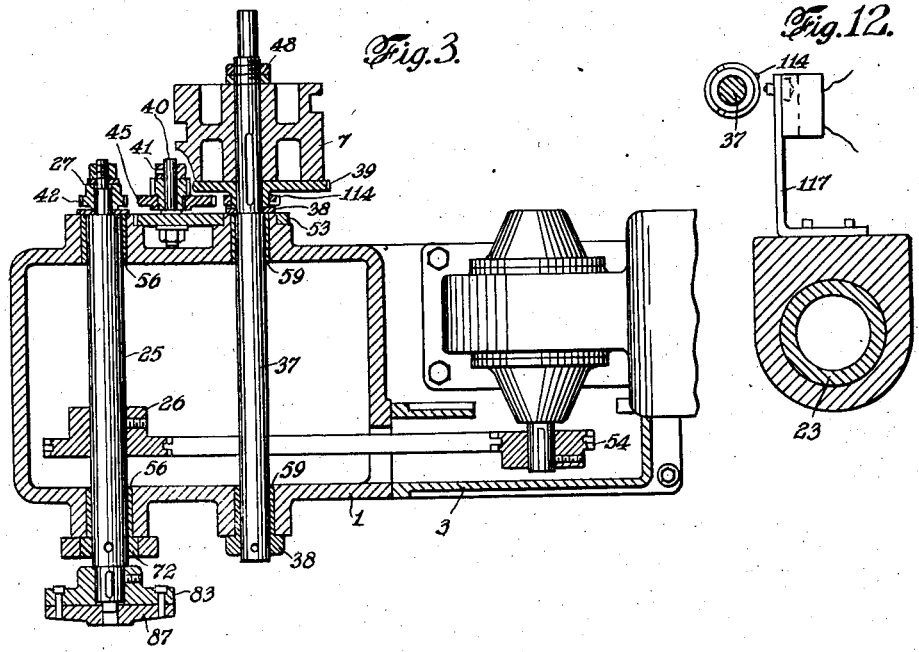
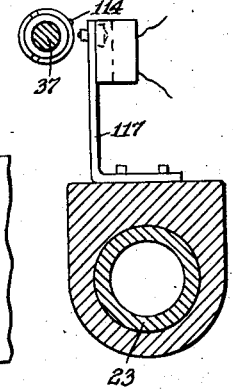

Aug. 20, 1946.  E. D. BOYCE  2,406,130
COIL WINDING APPARATUS
Filed Sept. 12, 1942  5 Sheets-Sheet 3
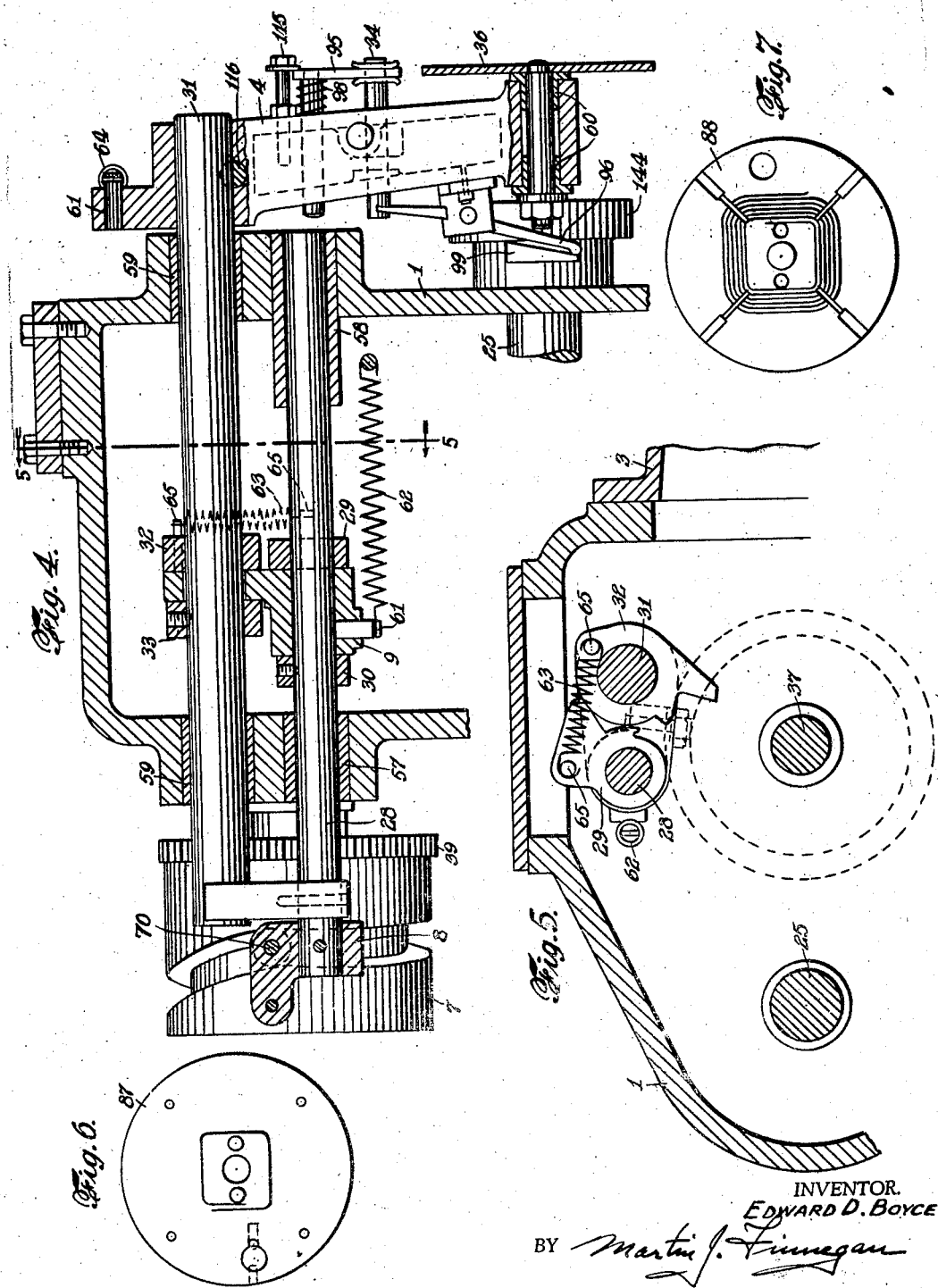
INVENTOR.
EDWARD D. BOYCE
BY
ATTORNEY

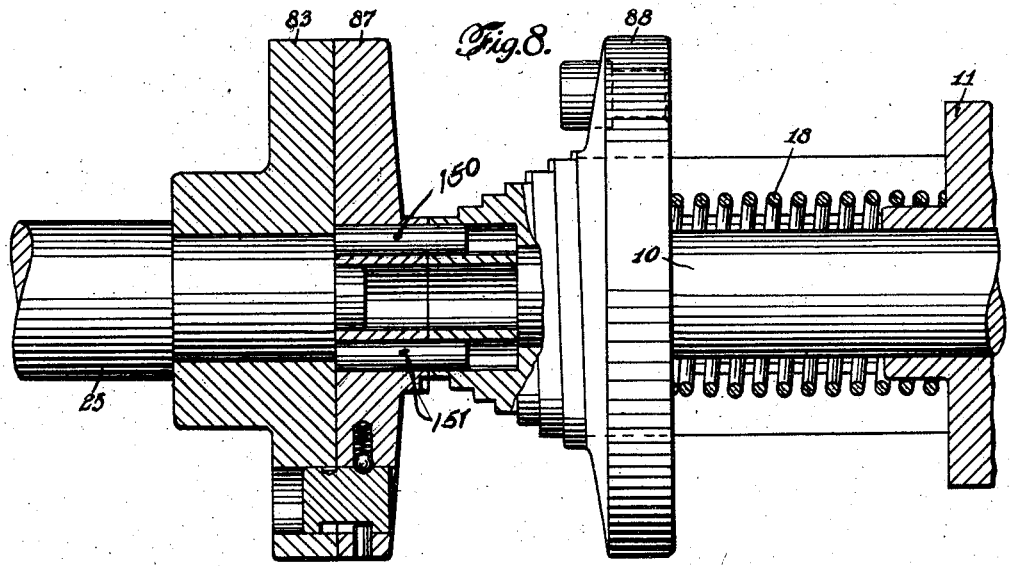
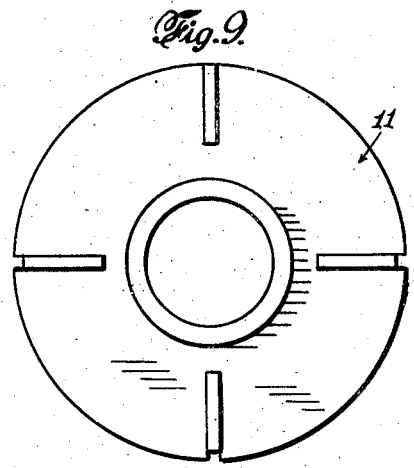
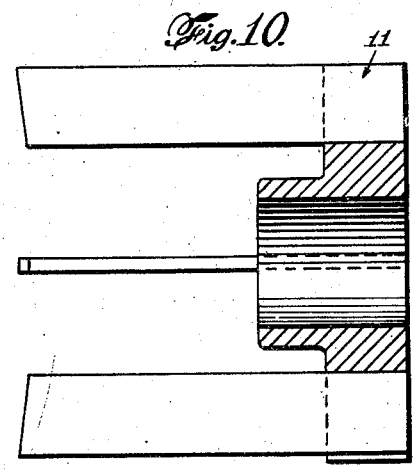
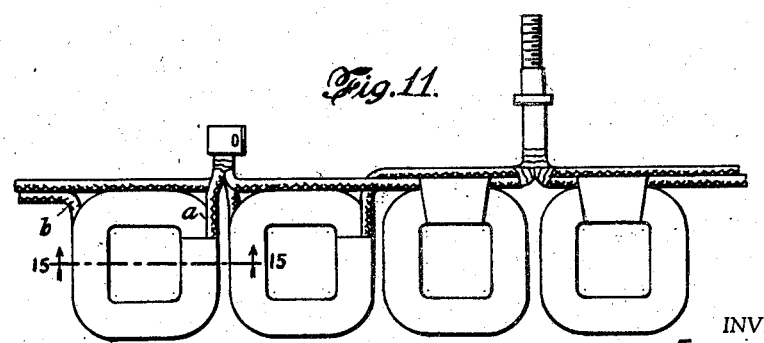

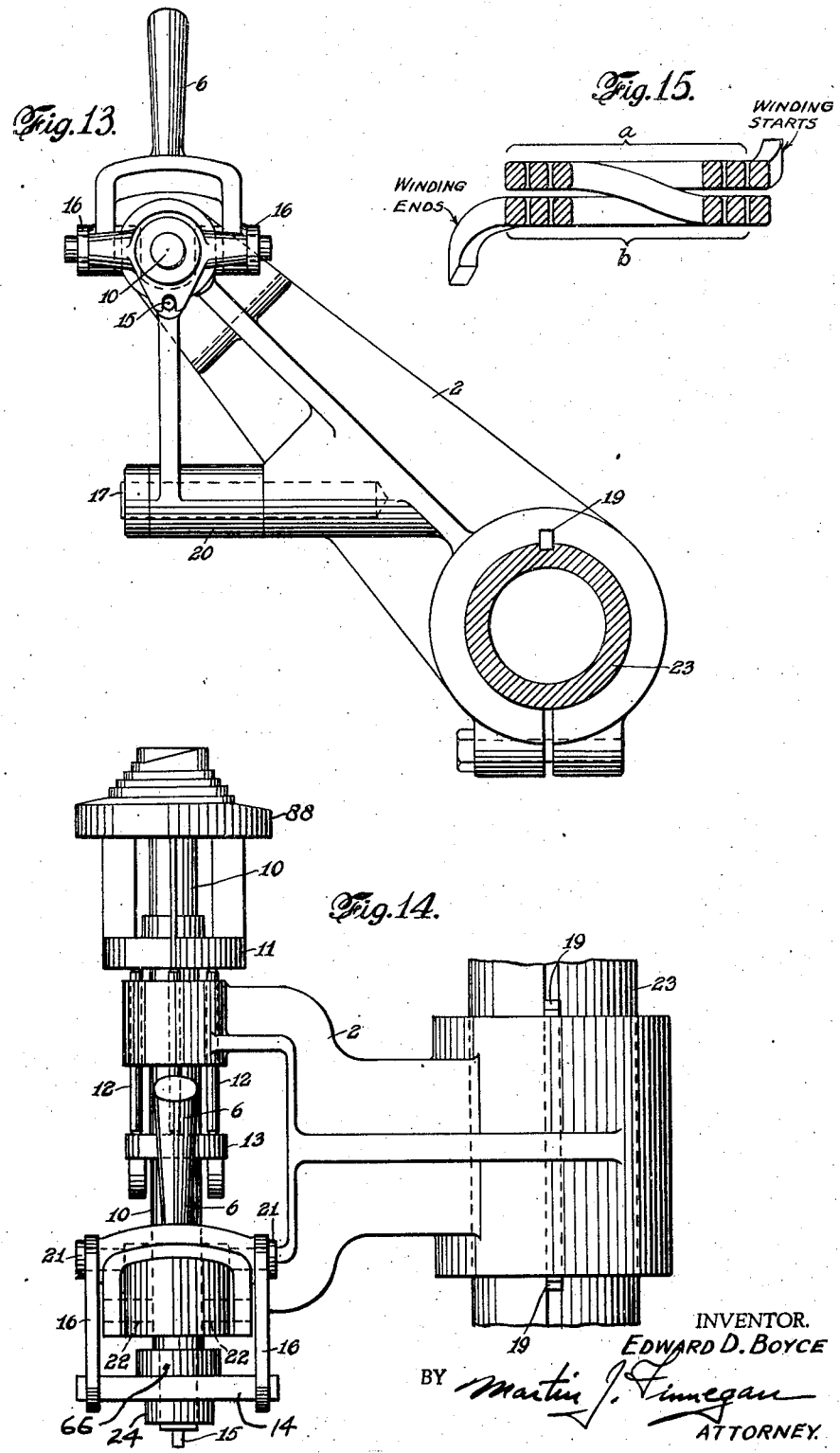

Patented Aug. 20, 1946

2,406,130

UNITED STATES PATENT OFFICE 2,406,130

COIL WINDING APPARATUS

Edward D. Boyce, Little Falls, N. J., assignor to Bendix Aviation Corporation, South Bend, Ind., a corporation of Delaware Application September 12, 1942, Serial No. 458,110

3 Claims. (Cl. 140—92.2)

My invention relates to electrical windings for dynamo-electric machines, and particularly to an apparatus for constructing preformed coils.

In certain types of electric motors there are two or more series-wound field coils, spaced at equal angular intervals about the housing of the motor, and usually each coil has to be wound in two separate operations, due to the necessity of having both ends of the winding on the outside or periphery of the finished coil, because the bulk of the wire itself does not leave enough space for any other arrangement of the ends.

The object of my invention is to make it possible to wind each field coil of the motor in such a manner as to shorten the time for completion of the operation, and reduce the amount of skill required.

In the drawings:

Fig. 1 is a view of a winding machine on which my invention has been practiced;

Fig. 2 is a view along line 2—2 of Fig. 1;

Fig. 3 is a view along line 3—3 of Fig. 2;

Fig. 4 is a view along line 4—4 of Fig. 2;

Fig. 5 is a view along line 5—5 of Fig. 4;

Figs. 6 and 7 are views of the two halves of the winding form;

Fig. 8 is a view of the winding form, with its two halves in operative relationship;

Figs. 9 and 10 are views of the coil compressing means;

Fig. 11 shows the assembly of field coils for a single motor, which coils have been wound on the machine of Figs. 1 to 7;

Fig. 12 is a view of the circuit breaker;

Figs. 13 and 14 are views of the operating means for the coil compressing means; and Fig. 15 is a view on line 15—15 of Fig. 11, except that the number of turns of wire, as shown, is less than in an actual coil, if wound on the forms 87, 88 of Fig. 8.

As shown, the machine includes a pair of winding forms, one mounted on a head stock and one on a tail stock aligned therewith, means for rotating the forms to cause the wire to be received thereon in sequence, means for automatically stopping the rotation, and means for shifting one form axially of the other, first, to complete the forming of the coil, and thereafter, to provide an open space through which the completed coil may be removed without dismantling any part of the machine.

There is indicated in Fig. 11 a type of motor field coil assembly in which each coil is in two sections, *a* and *b*; sections *a* and *b* being axially spaced, one from the other (see Fig. 15), and both sections being wound from a single strip of wire, adapted to be applied as a single operation, by reason of the novel construction of the winding forms (Figs. 6, 7 and 8) and of the winding machine (Figs. 1 to 5) of which said winding forms constitute a component part.

In the drawings, reference numerals are applied to the winding machine as follows:

Numeral 1 is applied to the housing, 2 is applied to the tail stock bracket, 3 is applied to the motor sprocket guard (Fig. 2), 4 is applied to the pressure lever (Figs. 1, 2 and 4), 5 is applied to the bell crank lever, 6 is applied to the toggle lever, 7 is applied to the cam which operates cam follower 69 and shifter bar 28; 8 is applied to the holder for cam follower 69; 9 is applied to the shifter for pressure shaft 31, 10 is applied to the tail stock spindle, 11 is applied to the coil compression blades and holder, 12 is applied to the coil compression rods, 13 is applied to the coil compression ring, 14 is applied to the toggle lever yoke which operates spindle 10, 15 is applied to the toggle lever yoke guide pin, 16 is applied to the toggle lever links, 17 is applied to the pivot shaft for bell crank 5, 18 is applied to the tail spindle spring, 19 is applied to the tail stock key, 20 is applied to the bell crank lever collar, 21 is applied to the pivot for link 16, 22 is applied to the lever pivot, 23 is applied to the tail stock support, 24 is applied to the tail spindle collar, 25 is applied to the winding shaft, 26 is applied to the winding shaft sprocket, 27 is applied to the winding shaft end collar, 28 is applied to the shifter bar, 29 is applied to the shifter bar stop, 30 is applied to the shifter bar collar, 31 is applied to the pressure shaft, 32 is applied to the pressure shaft stop, 33 is applied to the pressure and cam shaft plain collar, 34 is applied to the wire guide (adjustable), 36 is applied to the pressure disc, 37 is applied to the cam shaft, 38 is applied to the cam shaft washer, 39 is applied to the cam shaft gear, 40 is applied to the intermediate gear shaft, 41 is applied to the intermediate gear shaft collar, 42 is applied to the winding shaft gear, 45 is applied to the intermediate gears, 48 is applied to the cam shaft nut, 53 is applied to the gear adjustment quadrant, 54 is applied to the motor sprocket, 56 is applied to the winding shaft bearing, 57 is applied to the shorter shifter bar bearing, 58 is applied to the longer shifter bar bearing, 59 is applied to the pressure and cam shaft bearing, 60 is applied to the pressure disc shaft bearing, 61 is applied to spring pin, 62 is applied to the shifter bar spring, 63 is applied to the shifter bar stop spring, 64 is applied to the pressure lever spring, 65 is applied to the shifter stop spring pin, 66 is applied to the tail spindle thrust bearing, 69 is applied to the cam roller, 70 is applied to the cam roller pin, 71 is applied to the winding shaft thrust collar, 72 is applied to the winding shaft front collar, 73 is applied to the tail stock support clamp, 77 is applied to the housing cover, 95 is applied to the guide spring pin, 96 is applied to the wire guide lever, 99 is applied to the cam (on collar 144) which causes the wire guide lever 96 to be automatically swung sufficiently to shift the wire guide 34 (and hence the wire) at the moment when the wire should be transferred from form 88 to form 87, 98 is applied to the wire guide spring, 114 is applied to the limit switch actuator, 115 is applied to the wire guide stop screw, 116 is applied to the pressure lever lock bolt, and 117 is applied to the limit switch mounting.

In operation, the wire is fed to the operator (from an adjacent spool, not shown) and the end thereof is directed toward the right-hand half 88 of the rotating winding form. As shown in Figs. 1 and 14, the half 88 of the winding form has a contour in the form of a spiraling track, which track receives the wire at its point of largest diameter, and thus causes the wire to be reeled along the track as the form rotates; the rotary motion being transmitted to the form by the motor-driven sprocket members 54 and 26, and shaft 25.

As the wire is received by the spiraling track at the larger end of said spiraling track, it follows that the first section of the coil will be formed from the "outside" toward the "inside," while the second section of the coil will be formed (on left-hand half 87 of the winding form) in the normal direction of conventional winding practice, that is, from the "inside," or center, to the "outside," or outer periphery; but both sections will be integral parts of a single strip of wire, due to the fact that the feeding of the wire is continuous, first, along the spiraling track (from the larger end to the smaller end of said track) and secondly, in superimposing fashion upon the left-hand portion 87—that is, as the forward end of the wire emerges from the smaller end of the spiraling track it finds itself suddenly shifted (by action of cam 99 on lever 96) to the left, so as to be guided around the periphery of the hub of the left-hand position 87 of the winding form, where it will continue to be wound upon said hub until the requisite number of turns (constituting section b of the coil, as shown in Fig. 8) have been wound, whereupon the rotation of the machine is stopped automatically, and the two wound sections (one on half 88, the second on half 87 of the form) are removed from the machine as a single coil unit; both sections being integral parts of a single strip of wire. However, before removing the coil the operator swings bellcrank 5 in a counter-clockwise direction, causing rods 12 to be pressed to the left, which in turn causes the spirally wound section (a) of the coil (on form half 88) to be "squashed" toward the flat-wound section (b) on form half 87. In this manner the spirally wound section (a) is also transformed into a flat-wound section, similar to section b in shape, and each section having an end of the coil winding disposed at the periphery.

Pressure is exerted against the wire as it is wound, first on form 88, then on form 87; the purpose being to keep the sides of the coil flat for compactness and greater electrical efficiency per unit of wire. The means for exerting such pressure comprise a pressure disc 36 (Figs. 2 and 4) mounted on the end of lever 4 and urged into the downwardly tilting position shown in Fig. 2 by the pressure of the operator's foot upon a pedal (not shown) which is resiliently linked to said lever 4. Upon release of such pressure, spring 64 acts to reverse the position of lever 4, thus freeing the coil of the pressure of disc 36, and permitting removal of the wound coil from the machine. Lever 4 rocks about the axis of shaft 31, and causes said shaft 31 to rock correspondingly, due to the key connection between 4 and 31, as shown in Fig. 4.

In order to synchronously shift the pressure disc 36 from right to left (Fig. 4) along the spiral track on form 88, as the wire is reeled thereon, there is provided a shifter mechanism including a shifter bar 28, a cross-head 8 carried by said shifter bar 28, a cam follower (roller) 69 carried by cross-head 8, and a cylindrical cam 7 having a helical groove to receive cam follower 69 and shift said cam follower along a line parallel to shifter bar 28 as the cam 7 is rotated in synchronism with (but much slower than) the rotation of the motor-driven winding shaft 25; there being a step-down gear train (shown in both Figs. 1 and 3) drivably connecting 25 and 7.

The shifting of bar 28 (by action of cam elements 7 and 69) is communicated to pressure disc 36 by way of shaft 31 and lever 4, both of which are shifted along with bar 28 by reason of the coaction of elements 9 and 33. (Fig. 4). A spring 62 is provided to return bars 28 and 31 to the extreme right position when cam follower 69 is raised out of the helical groove in cam 7, at the end of the leftward travel of pressure disc 36. The raising of follower 69 occurs automatically by the action of spring 64, above referred to, in swinging shaft 31 in a clockwise direction, as viewed in Fig. 5, and thus producing a corresponding swinging of bar 28 and a corresponding lifting of the cam follower 69; all this occurring automatically upon release of the foot pedal (not shown) controlling lever 4.

The automatic stopping of the winding shaft 25 is due to the action of striker point 114 on disc 38, the latter being mounted on cam shaft 37 to rotate therewith. When cam shaft 37 has rotated through its complete cycle of one revolution (corresponding to the number of revolutions of shaft 25 which are required for complete winding of the coil) striker point 114 will engage the yieldable element of the limit switch mounted on arm 117, and move the switch to circuit-opening position. This interrupts flow of current to the electric motor which is shown in Fig. 3 as the source of power for operation of winding shaft 25. The motor circuit is re-closed manually when the operator is ready for the next winding operation.

After the "squashing" (coil flattening) operation of the presser rods 12, acting upon the compression blade assembly 11, in response to swinging of bell-crank 5 (by a foot pedal and rod connection, not shown), the wire is severed and the completed coil is ready for removal from the machine. Before it can be removed, however, form 88 must be shifted to the right, in order to clear itself from pins 150, 151 (see Fig. 8). This is done by swinging toggle lever 6 to the right (Fig. 1) which acts to draw tail spindle 10 to the right (through the pressure of yoke 14 on collar 24, the latter being integrated with spindle 10). As spindle 10 is thus shifted to the right, the form 88 shifts correspondingly, due to the connecting key (not shown) therebetween. This rightward shift of form 88 releases it from pins 150 and 151, and the wound coil can now be removed. As soon as the coil is removed, the operator restores lever 6 to the position indicated in Fig. 1, the spring 18 acting simultaneously to return form 88 to the position (Figs. 1 and 8) which it occupies during winding of the coil forming wire thereon. During shifting of spindle 10 and form 88, first to the right, then to the left, bearing assembly 66 (see Figs. 1 and 14) takes the thrust.

What is claimed is:

1. In coil winding apparatus, the combination, with a pair of winding forms, one having a spirally extending track of diminishing diameter and the other a circular track of a diameter corresponding to the least diameter of the first-mentioned track, of means for rotating said forms in unison, means operative during such rotation for feeding a single wire onto said spiral track and then causing the adjacent length of wire to be wound upon said circular track in superimposing fashion, means for stopping the winding operation when the number of turns wound on said circular track equals the number of turns wound on the spiral track, means for compressing the spirally wound turns into a substantially flat formation corresponding to the substantially flat formation of the portion of the coil that was wound on the circular track, and means slidable along the axis of rotation of said forms for thereafter axially displacing the first-named form with respect to the second-named form so as to produce a free space for transverse removal of the coil, as wound, from the winding apparatus, while all parts of the apparatus remain in assembled relationship, one to the other.

2. In coil winding apparatus, the combination, with a pair of winding forms, one having a spirally extending track of diminishing diameter and the other a circular track of a diameter corresponding to the least diameter of the first-mentioned track, of electrical means for rotating said forms in unison, means operative during such rotation for feeding a single wire onto said spiral track and then causing the adjacent length of wire to be wound upon said circular track in superimposing fashion, switch means for stopping the winding operation when the number of turns wound on said circular track equals the number of turns wound on the spiral track, and means for compressing the spirally wound turns into a substantially flat formation corresponding to the substantially flat formation of the portion of the coil that was wound on the circular track.

3. In coil winding apparatus, the combination, with a pair of winding forms, one having a spirally extending track of diminishing diameter and the other a circular track of a diameter corresponding to the least diameter of the first-mentioned track, of electrical means for rotating said forms in unison, means operative during such rotation for feeding a single wire onto said spiral track and then causing the adjacent length of wire to be wound upon said circular track in superimposing fashion, and switch means for stopping the winding operation when the number of turns wound on said circular track equals the number of turns wound on the spiral track.

EDWARD D. BOYCE.